United States Patent [19]
Levin et al.

[11] Patent Number: 5,120,961
[45] Date of Patent: Jun. 9, 1992

[54] HIGH SENSITIVITY ACOUSTO-OPTIC TUNABLE FILTER SPECTROMETER

[75] Inventors: Kenneth H. Levin; Frank Y. Li, both of Silver Spring, Md.

[73] Assignee: Infrared Fiber Systems, Inc., Silver Spring, Md.

[21] Appl. No.: 494,342

[22] Filed: Mar. 16, 1990

[51] Int. Cl.$^5$ .................. G02F 1/11; G01N 29/02; G01N 21/00
[52] U.S. Cl. .................. 250/339; 250/343; 356/51; 359/285
[58] Field of Search ............... 250/339, 343; 350/358, 350/372; 356/300, 346, 436, 326, 51; 359/285, 286, 287

[56] References Cited

U.S. PATENT DOCUMENTS

| | | | |
|---|---|---|---|
| 3,764,196 | 10/1973 | Dean et al. | 350/358 |
| 4,272,825 | 6/1981 | Smithline et al. | 350/372 X |
| 4,422,154 | 12/1983 | Smithline et al. | 350/358 |
| 4,448,494 | 3/1984 | Freyre | 350/358 |
| 4,460,250 | 7/1984 | Freyre et al. | 350/358 |
| 4,548,477 | 10/1985 | Agano | 350/358 |
| 4,600,307 | 7/1986 | Krohn et al. | 356/346 |
| 4,653,869 | 3/1987 | Gottlieb et al. | 350/372 |
| 4,663,961 | 5/1987 | Nelson et al. | 73/24.02 |
| 4,687,958 | 8/1987 | Sommargren | 350/358 X |
| 4,697,888 | 10/1987 | Schmadel, Jr. et al. | 350/358 |
| 4,720,177 | 1/1988 | Chang | 350/372 |
| 4,883,963 | 11/1989 | Kemeny et al. | 250/339 |
| 4,940,316 | 7/1990 | Brandt | 350/358 |

Primary Examiner—Constantine Hannaher
Assistant Examiner—Edward J. Glick
Attorney, Agent, or Firm—Browdy and Niemark

[57] ABSTRACT

An acousto-optical filter (AOTF) is used in a spectrometer for analysis of samples. The spectrometer provides continuous wave RF excitation through the crystal, and the spectrometer provides control and modulation for said RF source. The signal to noise ratio is improved by use of a lock-in amplifier which demodulates the modulation frequency. Fiber optics are used to connect the crystal to the source, and the source to the detection system. A digital lock-in amplifier is designed which increases the efficiency, accuracy, sensitivity and decreases the cost of conventional analog lock-in amplifier.

23 Claims, 5 Drawing Sheets

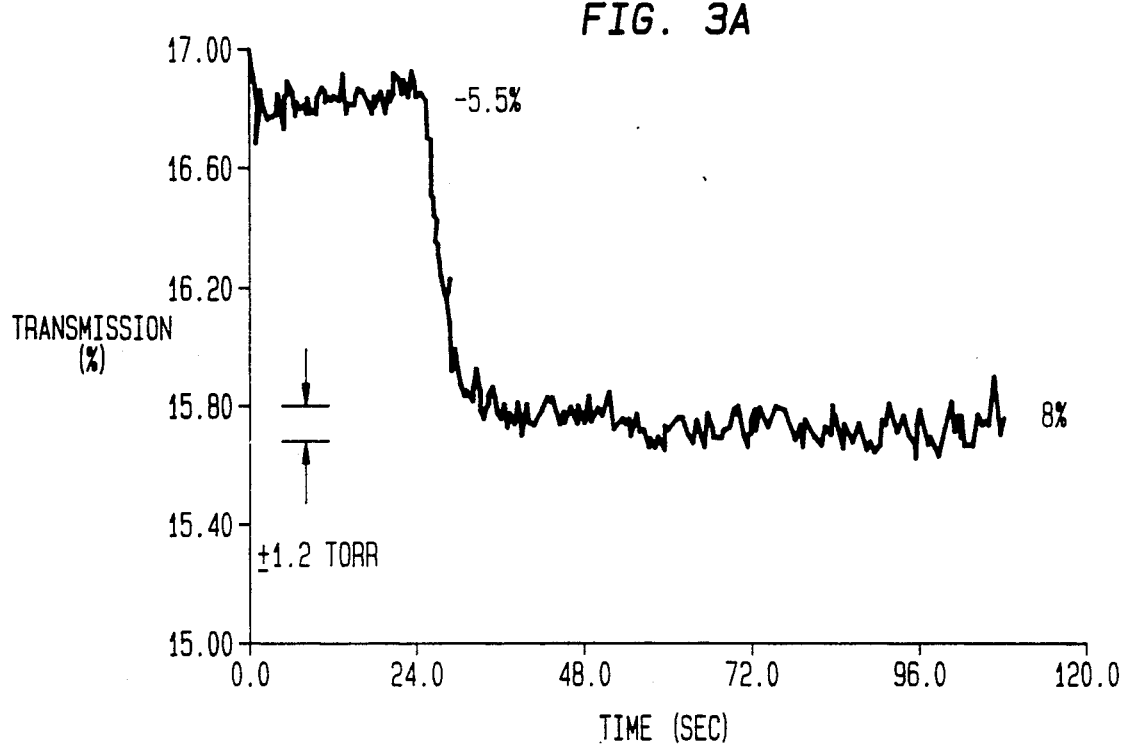
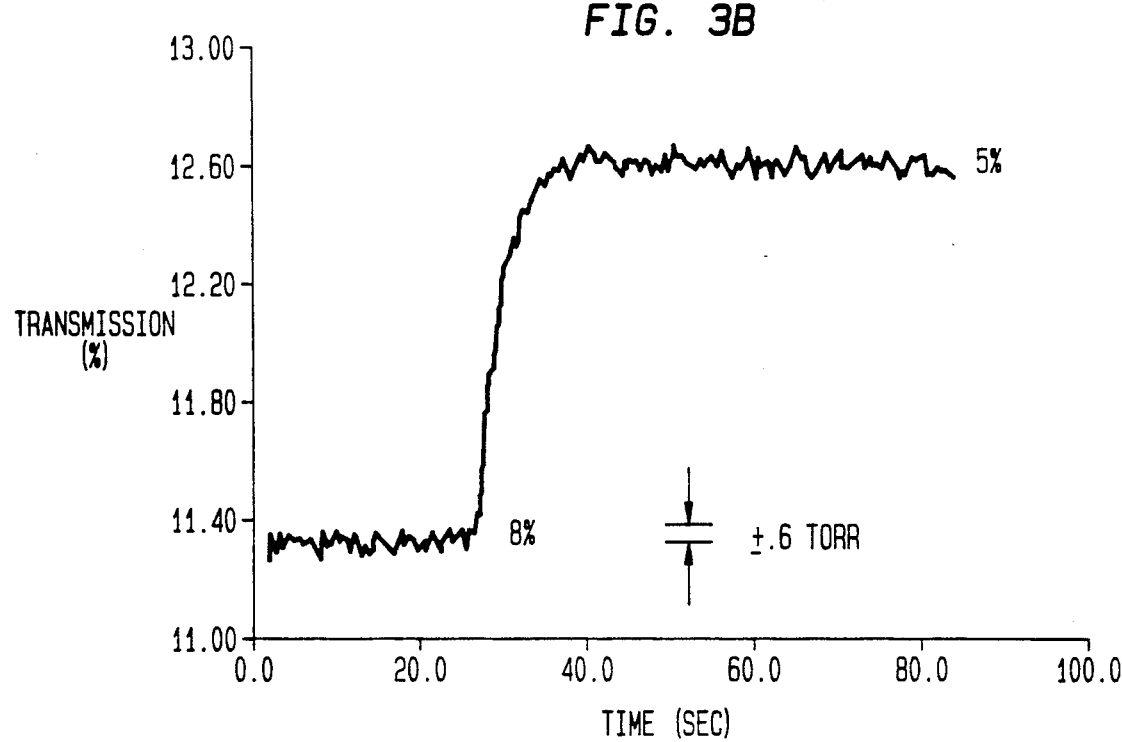

HIGH SENSITIVITY ACOUSTO-OPTIC TUNABLE FILTER SPECTROMETER

BACKGROUND OF THE INVENTION

1. Field of the Invention

This invention is directed to a system and technique for remote infrared spectrum analysis and chemical analysis. The invention provides for the use of a solid state acousto-optic device or acousto-optic tunable filter (AOTF) in combination with fiber optic technology in order to provide a system for infrared spectrum analysis, chemical analysis and of the species of interest.

2. Description of Prior Art

The acousto-optic tunable filter (AOTF) is a birefringent crystal having an acoustic transducer bonded to one face. Broad band light radiation passing through a crystal can be diffracted into specific wavelengths by application of a radio-frequency driving signal to the crystal transducer. The AOTF device can be used as a part of a spectrometer or other optical instrument. The AOTF has several advantages over alternative spectroscopic techniques such as filter wheels, diffraction gratings, and Fourier transform infrared. The AOTF is small, fast, reliable and has no moving parts. Because of these features, the AOTF can be used for applications such as chemical process control, medical diagnostics, spectral radiometry, and real time composition analysis in the production environment. When coupled to fiber optics, the AOTF can be located remote from the sample of interest. This remote location has an advantage when the sample is in a harsh or potentially explosive environment. Fiber coupling reduces a chance of explosion by eliminating all electrical voltage in the sampling region. However, because of the low fiber optic throughput, and poor transmission at certain wavelengths, the sensitivity of the system is severely degraded when fiber optics are used. The sensitivity can also be reduced if the sample is highly absorbing, or if the AOTF has a very narrow optical bandpass.

U.S. Pat. No. 4,490,845, Steinbruegge et al. discloses an automated acousto-optic infrared analyzer system wherein an acousto-optical tunable filter (AOTF) is supplied with radio-frequency pulses typically about 3.5 microseconds long, 10 watts of peak power over an operating frequency range of 20-100 MHz to the transducer filter.

U.S. Pat. No. 4,490,845, Steinbruegge et al. discloses an acousto-optic tunable filter infrared analyzer consisting of a crystal and a variable frequency RF energy source whereby acoustic waves are launched in the crystal to interact with the selected narrow band-width portion of the polarized infrared radiation to make it distinguishable from the remaining radiation. The RF source provides an RF pulse which is of the proper width to provide an RF power duty cycle limited to a load level which does not overheat the crystal.

U.S. Pat. No. 4,663,961, Nelson et al. discloses an acousto-optical tunable filter for performing spectral analysis of chemicals at a remote location. This patent utilizes a pulse RF source having a duty cycle of 1% and a peak-to-peak voltage across the transducer of approximately thirty volts. The crystal which is disclosed to have been utilized in experiments is a noncollinear thallium arsenic selenide AOTF. The specification also discloses that the acoustical optical tunable filter can utilize a $TeO_2$ crystal. In this disclosure, only a pulsed RF source is disclosed.

When pulsed RF sources are used, the signal to noise ratio is limited, the sensitivity of the system is lowered, and the throughput is lowered because of the low duty cycle.

BRIEF SUMMARY OF THE INVENTION

In applicant's invention the AOTF is driven by a continuous wave RF signal. It has been found that tellurium dioxide ($TeO_2$) is a stronger crystal than a thallium arsenic selenide ($Tl_3AsSe_3$ or TAS). The tellurium dioxide crystal in this invention can withstand over five watts of continuous RF power without damage to the crystal.

In this invention, the continuous RF power is sinusoidally modulated to improve the signal to noise ratio. An infrared light source is collimated as the incident beam of the AOTF device. The output beam from the AOTF device is refocused on a fiber, and the fiber brings this beam into a test sample or a sample cell. After the light passes through the sample it is focused onto a return fiber and transmitted to the detector. The detected signal is amplified and processed by phase sensitive lock-in amplifier technology which can be realized by either an analog lock-in amplifier, analog demodulator, digital lock-in amplifier by a digital signal processor, or a high speed computer. The wavelength of the light is proportional to the frequency of the driving power which is controlled by the computer. The intensity of the diffracted light is proportional to the RF power. The signal to noise ratio is increased by modulating the RF power and optical signal with a reference frequency, and the optical signal is received by an optical detector which converts it into an electronic signal, and this signal is demodulated by a lock-in amplifier. The lock-in amplifier could be a precision demodulator which is built by a narrow band AC amplifier, a precision rectifier and a low pass filter, a single phase or a quadrant phase sensitive amplifier, or a digital lock-in amplifier with a digital signal processor.

In this invention an improved AOTF spectrometer is provided where the AOTF is driven by a continuous radio frequency (RF) source which is modulated at a reference frequency. The detected signal is then demodulated using a phase sensitive amplifier (lock-in amplifier). This results in greatly improved sensitivity, accuracy and speed and in the rejection of spurious light and various noise which comes from the detector and circuits. Otherwise, this noise will interfere with the signal of interest.

This invention also may utilize an un-diffracted (birefringent) beam from the AOTF. This birefringent beam contains all of the wavelengths except the wavelength being diffracted. This can be called an acousto-optic notch filter (ANOF). Since there are actually two separate diffracted beams (the ordinary and extraordinary polarizations), the birefringent beam can be used to obtain a spectral signal which is twice as strong as either diffracted beam. The disadvantage of this embodiment is that the optical resolution if worse with the birefringent beam as compared to the diffracted beam. In samples not requiring high resolution, and having a poor signal to noise ratio, the technique of using the birefringent beam can be used to improve the sensitivity of the system.

In this invention, the diffracted wavelength from the AOTF is determined by the frequency of the RF driving source, and the RF frequency is generated by an RF synthesizer which is controlled by a computer. The RF driving power is a continuous, rather than pulsed signal. The RF signal is modulated with a reference frequency by an RF mixer or multiplier. The reference frequency should be determined by the limitation of the detector and components of the system, and a sinusoidal signal is recommended to use as the reference in order to decrease the harmonic noise in the system. Because the optical intensity responds to the power change of the AOTF or the power of the RF driving source, but not the amplitude change of the RF driving source, the optical signal is equal to the double frequency of the amplitude modulation reference. Therefore, the frequency response of the detector and signal processing system requires double the reference frequency as well as. Normally, the frequency range of the modulation signal may be from 1 Hz to several MHz but the preferred range is 100 Hz to 100 KHz because of the limitation of the hardware. The high frequency will bring high speed relatively, but the trade off is the cost of the system. In any case, it should be operated in the peak performance range of the detector.

The advantages in driving an AOTF with a continuous wave RF signal which is modulated with a reference frequency are:

(1) In the case of very low signal levels where the noise is comparable to or greater than the signal, a phase-sensitive amplifier (lock-in amplifier) can be used to greatly increase the signal to noise ratios to more than 10 to 1000 times compared with the pulsed RF signal driving method. In the case where the input signal level is about more than 100 times stronger than the noise, a precision demodulator can be used to demodulate the signal instead of a quadrant lock-in amplifier. The precision demodulator is built by a narrow band AC amplifier, a precision rectifier and a high efficiency low pass filter, and it emulates the single phase lock-in amplifier by synchronizing the demodulation with the input signal level but not a synchronization signal. This lowers the cost of the electronics system, and still provides a much higher signal to noise ratio on the output than the pulsed RF power method does.

(2) The modulated continuous wave power of this invention provides for rejection of spurious light which enters the detector since the amplifier is only sensitive to the modulated light from the AOTF. A problem with prior art AOTF designs is in the location and separation of the diffracted light from the undiffracted light (the bifringement beam). These two beams are separated only by a few degrees. Therefore, any misalignment of the optical system could bring a large amount of noise or offset. In this invention however modulation of the diffracted light makes the separation of the beams easy.

(3) The continuous wave technique of this invention can monitor the signal continuously compared to the pulsed RF driven AOTF. In a pulsed system, a transient or high speed signal may occur during the period of the off time between pulses and thus it could miss some important information. In this invention, transient phenomenon may be observed by the AOTF when it is driven continuous wave without modulation by detecting the optical signal using a wide band AC amplifier. For example, a high speed analog to digital converter and high speed frequency synthesizer may be used to achieve a data acquisition time of fifty microseconds per wavelength point.

(4) In this invention, for extremely fast response time, the modulation frequency can be increased to 100 KHz which is much higher than the speed obtainable with mechanical chopper wheels of the prior art. This high frequency may also improve the signal to noise ratio by being much higher than the frequency of other noise components, and increase the speed of the system.

(5) By use of this lock-in technology, it remarkably overcomes the noise not only from the optical system, but also from the detector and analog circuit. This noise includes the thermal noise, excess noise, shot noise, cross talk noise, power supply noise, drift noise and various white noise in the system.

(6) Another advantage is the lack of rf harmonics which are produced by the pulsed technique. These harmonics degrade the performance of the AOTF by causing transmission at harmonic wavelengths.

The invention, provides a new technique which improves the performance and decrease the cost of conventional lock-in amplifier by using a digital signal processor.

In this invention, a digital signal processor (DSP) may be used to realize a digital lock-in amplifier and to replace the analog lock-in amplifier or demodulator. The way is: (1) by using a high speed A/D converter to digitize the signal from pre-amplifier directly, (2) the digitized signal is sent to the DSP directly, (3) by the use of software function to emulate the analog lock-in amplifier function to realize the digital lock-in amplifier in the DSP.

The advantage to use DSP emulated lock-in amplifier to replace the conventional lock-in amplifier is:

(1) it has much higher speed, stability, accuracy, signal to noise ratio and efficiency compared with the analog lock-in amplifier, because the digital signal processing has much higher efficiency and accuracy than the analog circuit function. For example, filter efficiency and stability is one of the key points to determine the speed, stability and accuracy of the lock-in amplifier. Using the digital filter, the cut-off of the frequency response may be very sharp compared with the analog filter, and it is independent of the temperature coefficients of the analog devices.

(2) it decreases the cost of development and production, because most of the functions are implemented by software and it is easy to develop and produce. Also, because the DSP can replace a computer completely to implement the instruments, and it can perform a better job than a computer in this application, and a computer can be saved in the system.

(3) it is much more flexible than the analog lock-in amplifier, since it is very easy to change the system configuration by simply changing software parameters without increasing the hardware.

(4) this technology can be used not only in the AOTF spectrometer, but also the general purpose of lock-in amplifier with the same advantages and benefits.

BRIEF DESCRIPTION OF THE DRAWINGS

FIG. 3A shows a step change in carbon dioxide from 5.5 to 8% as measured by the top diffracted beam.

FIG. 3B shows a step change from 8 to 5% using the middle (un-diffracted beam (AONF)).

DETAILED DESCRIPTION OF THE PREFERRED EMBODIMENTS

Figure 1:
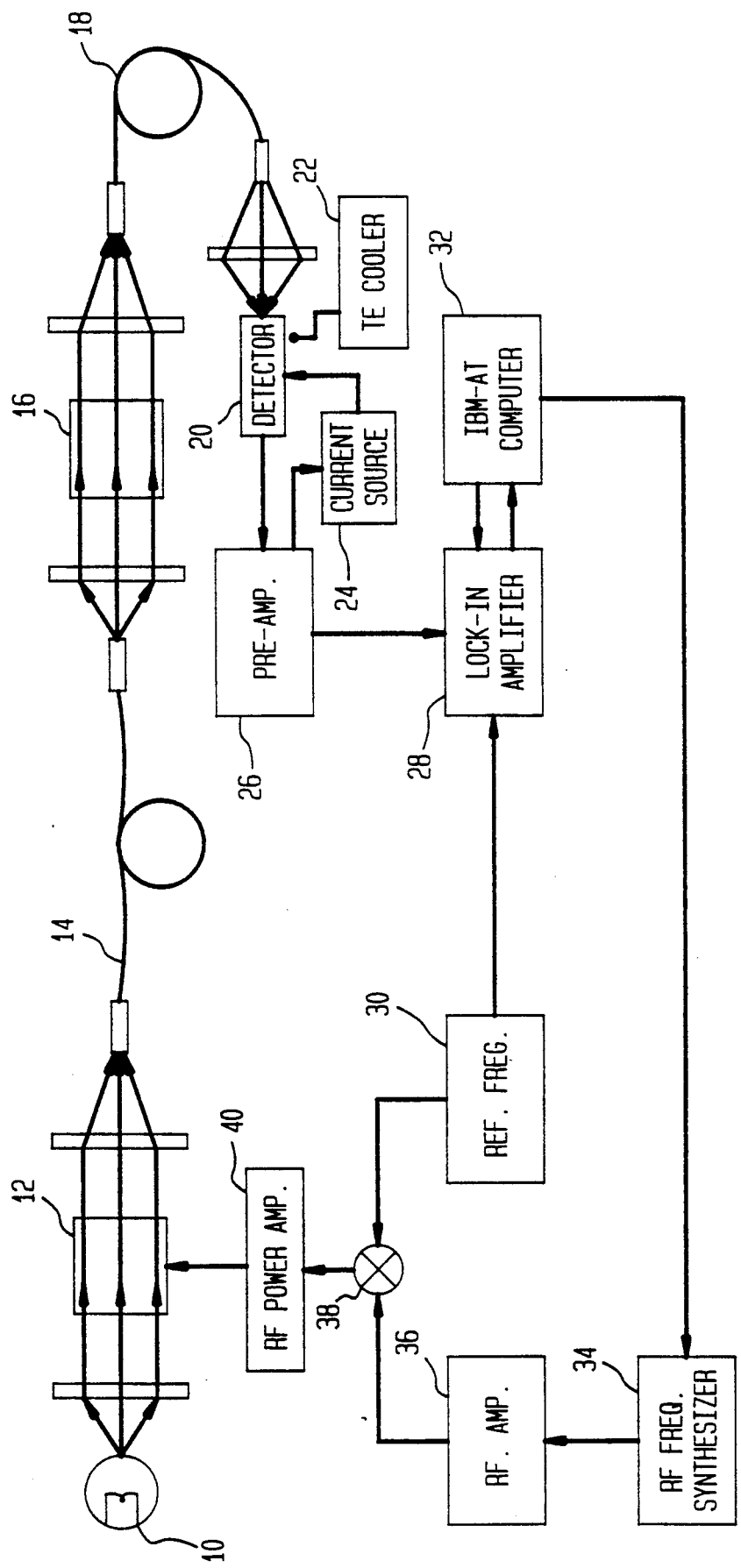
FIG. 1 shows a system diagram of an AOTF as used for sample analysis or spectroscopy.

In FIG. 1, broad band light source 10 is directed into the AOTF 12. The AOTF diffracts the light of different wavelengths as a function of the frequency of RF applied to the AOTF. The AOTF is a transparent birefringent crystal having a lithium niobate piezoelectric transducer bonded to one surface.

The optical fiber 14 located at the position to the output beam of the acousto-optic tunable filter 12 may be any suitable optic fiber such as quartz to use in the ultraviolet range, or zirconium fluoride which is suitable for mid-infrared wavelengths.

Sample cell 16 may be coupled to the output beam of the optical fiber 14, or directly coupled to the AOTF 12. Sample cell 16 contains a sample to be tested by the spectrometer of this invention. A lens collimates the beam from the optical fiber 14 through the sample cell 16, and there is another lens to refocus the beam to the returning fiber 18. The returning beam passes through the fiber 18 and is refocused by a lens onto a detector 20. Alternately, a concave mirror at the opposite end of the sample cell can serve to refocus the beam into the return fiber. In some instances, it is desirable to directly couple the detector 20 to the sample cell 16 thereby eliminating the optic fiber which attenuates the optical signal received by the detector 20. Note that some types of samples, such as solid samples, may not require a sample cell at all.

The detector 20 may be any device which responds to the magnitude of the optical intensity and optical wavelength received from the sample cell 16. A typical detector sensitive to the infrared wavelength range from 1 to 6 microns is a lead selenide detector. If the radiation is in the visible range, then a silicon photodiode may be used for the detector. Still further, a lead sulfide, germanium, or various types of detectors may be used for other wavelengths. The output of the detector 20 could be any electronic signal or parameter change due to the changes of receiving optical intensity and wavelength, for example a voltage, a current, a resistance or a capacitance change. The choice of parameter change is dependent upon the type of detector used. For instance, a lead selenide detector produces an impedance change response. Detector 20 may also incorporate a cooler 22 which is useful for noise reduction which including thermal noise, excess noise and dark current noise.

A current source 24 may be used to supply bias current to the detector if required. In FIG. 1, the current source is shown as a separate black box, but it is common to obtain such a source from an existing preamplifier 26. Photo-varistor detectors need bias voltage sources, or current sources, but photovoltaic detectors do not need any additional bias support.

The preamplifier 26 is a low noise amplifier which amplifies the signal and converts the signal to a voltage output from detector 20. If the signal output is a voltage, then the preamplifier may be a typical amplifier which directly amplifies the voltage. On the other hand, if the output from detector 20 is an impedance change signal, then the preamplifier must convert the signal to a voltage signal, and provide a voltage output.

The voltage output of preamplifier 26 is then applied to a lock-in amplifier 28. The lock-in amplifier may be a phase sensitive amplifier which could be an analog lock-in amplifier or a digital phase lock-in amplifier if the noise is greater than the signal. If a lock-in amplifier is used, the reference frequency generator 30 is used to provide the reference frequency to the phase sensitive lock-in amplifier. Because the optical intensity is proportional to changes of the AOTF driving power or the RF driving power which is double the reference frequency of the amplitude modulation, the detector, the amplifier, the lock-in amplifier or the demodulator need to be operated at double frequency also, and this requires the detector and system to response to the double frequency as well. The reference frequency 30 is also the frequency which is used to modulate the RF signal which is fed to the AOTF 12. A modulating frequency and corresponding lock-in reference frequency is 10 KHz in this setup, but it mainly depends on the responses of the detector and components in the system, as well as application requirements. Using this phase lock-in amplifier, signals outside of the double frequency of the reference frequency are rejected which substantially improves the signal to noise characteristics, and it can recover a signal from a signal to noise ratio of less than 1/1000 or −60 db.

In case the signal to noise ratio is more than 100, the lock-in amplifier may also be replaced by a signal demodulator which is built by a narrow band filter, a precision rectifier and a low pass filter. This method will simplify the system and decrease the cost.

In the case where lock-in amplifier 28 is a phase sensitive lock-in amplifier, the output is also a DC voltage. The lock-in amplifier as shown in FIG. 1 must also include an analog to digital converter, or there must be an analog to digital converter associated with the computer 32. Analog to digital converters which can be incorporated into the IBM-AT computer may be used with this invention.

In case the lock-in amplifier is a digital lock-in amplifier, it consist of a high speed A to D convertor (A/D), a digital signal processor (DSP) and the software which emulates the performance of the lock-in amplifier digitally. In this case the output data can be either transferred to the computer or output from the DSP directly, because the DSP can replace the computer function in the system to perform all of the control and data analysis functions.

The computer input is a digital signal which is proportional to the magnitude of the demodulated AC signal detected by detector 20.

The detector 20 ideally is a very fast detector which can respond to frequencies in the order of several megahertz. In some instances, it may be desirable to use a lead sulfide detector which is known to be slow. However, the slow response of the lead sulfide detector is compensated for by an improved signal to noise ratio or lower cost.

The computer 32 is used to process the signals and to control the RF frequency synthesizer 34 as well as the system. The computer generates a display which provides either quantitative or qualitative measure. In quantitative measurements, the X axis represents time and the Y axis may represent percentage of concentration of one fluid in another fluid.

The computer may also produce a qualitative analysis. In the qualitative analysis, the spectrum is scanned, and the spectrum of transmission, absorption or corresponding data according to wavelengths are displayed. In this mode, the X axis can, also, represent RF frequency which drives the AOTF during wavelength scanning, and the Y axis can represent the absorption produced by the sample.

The computer may also be used to identify unknown samples. A computer program may have a spectrum library which stores the information regarding the spectral characteristics of various elements or chemical compounds. The computer will then compare the spectral information received from an unknown sample with spectral patterns retained in the library, and identification of unknown sample can be made by comparison.

The computer 32 is also used to control the RF frequency applied to the AOTF crystal. In any crystal, the relationship between the input RF frequency and the diffracted beam can be determined. For instance, it may be known that a 15 MHz RF signal will produce four micron mid-infrared diffraction.

Therefore, if it is desired to provide a diffraction at a wavelength of four microns for mid-range infrared, the computer provides a command to frequency synthesizer 34 which corresponds to the desired 15 MHz frequency for the RF. The synthesized RF frequency is then amplified by a preamplifier 36 which has an output going to the local oscillator frequency input of the RF mixer 38. The reference frequency input of the mixer is from the reference frequency generator 30. Therefore, the output of RF mixer 36 is 100% amplitude modulation of the synthesized frequency from the RF amplifier 36 with the reference frequency from frequency generator 30.

In a typical application, the frequency from generator 30 may be 10 KHz. The reference signal is used for both modulation on the mixer 36 and demodulation on lock-in amplifier 28. The operating period on each RF frequency or each wavelength of AOTF scan or step is controlled by the computer 32. For instance, it has been found that 50 microsecond is long enough for each step when the signal to noise ratio from the output of the system is high. It should also be noted that if the signal to noise ratio is low, then the signal to the AOTF must be longer in order to have a greater period of time in which to average the output signal.

RF power amplifier 40 was used to amplify the modulated RF signal from mixer 38 prior to applying the RF power to the AOTF 12.

The frequency applied to the AOTF 12 can be changed approximately once every fifty microseconds by the computer 32 which controls frequencies produced by synthesizer 34. Fifty microseconds is the shortest sampling period which has been used with this apparatus. Samples may be taken every fifty microseconds when signal to noise ratio conditions permit. This period is limited by the setup time and response time of AOTF, frequency synthesizer, mixer, RF amplifier, detector, analog circuit, A to D converter, and computer.

The detector shown in FIG. 1 may also be modified by first passing the liquid into a sample cell and then passing the output light from the cell to a detector 20 and the associated electronics 26, 28, 30, 32, etc. This embodiment essentially exchanges the location of the AOTF 12 and the sample cell 16.

A continuous wave energy applied from the RF amplifier 40 to the AOTF 12 provides much faster response than the pulse techniques used with U.S. Pat. Nos. 4,490,845 and 4,663,965 referred to in the discussion of the prior art above. By use of the continuous wave wherein only frequency is changed, data can be taken in at a high rate, a rate which is much faster than that which is possible to obtain with the prior art pulse systems.

The use of the modulating frequency from the reference generator provides for substantially improved signal to noise ratios when the phase sensitive amplifier (lock-in amplifier) is utilized. However, if conditions permit, the signal processing and demodulation may be performed by a precision demodulator which consist of a narrow band AC amplifier with center frequency of double reference frequency, and a precision rectifier and an active low pass filter. This circuit emulates the single phase lock-in amplifier and uses the signal as a synchronization signal. Similarly, the output of the signal from the low pass filter is sent to the A to D converter.

Figure 2:
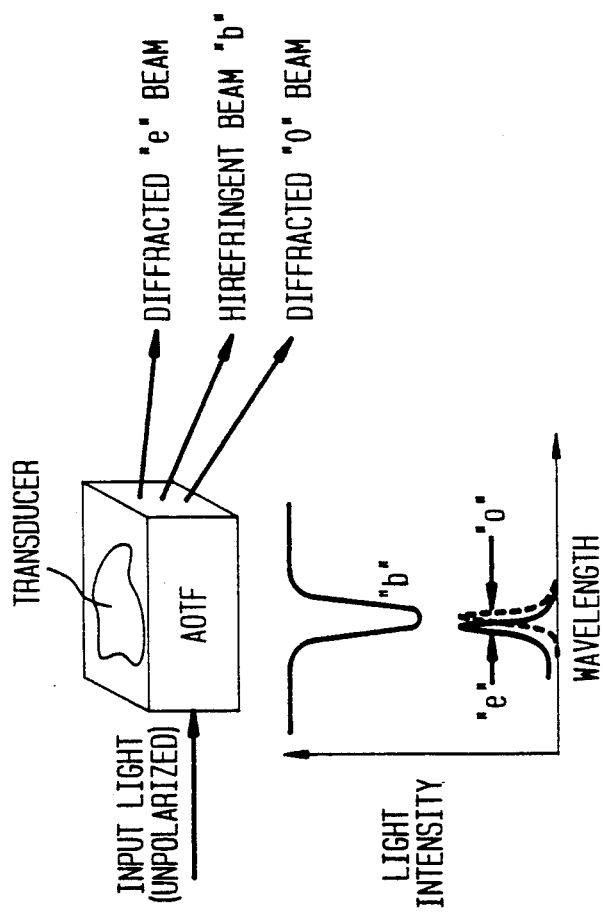
FIG. 2 shows the relative positions of a bifringement beam and the diffracted beams of a typical AOTF device.

In FIG. 2 there is shown a graph of light intensity versus wavelength. In prior art spectrometers such as those discussed in the introduction to this patent specification, it has been the practice to detect the diffracted beam, either the "e" or "o" beam. This is detection of a wavelength wherein intensity increases. In this invention, it is contemplated that the birefringent beam may be detected. In the graph of FIG. 2, the birefringent beam is identified as curve "b". The birefringent beam remains at high intensity, except at the frequency where diffraction occurs. This provides a curve "b" which displays a notch at the critical detection frequency. The notch B is broader than the diffraction beams "o" and "e". Detection of the reduced intensity frequency of the birefringent beam is an acousto-optic notch filter (AONF).

Since there are actually two separate diffracted beams (the ordinary and extraordinary polarizations), the birefringent beam can be used to obtain a spectral signal which is twice as strong as either diffracted beam. The disadvantage of using the birefringent beam is that the optical resolution is worse when compared to the diffracted beam. For samples not requiring a high resolution, and where there is a poor signal to noise ratio, the acousto-optic notch filter technique can improve the sensitivity of the system.

EXAMPLE 1

The apparatus in accordance with FIG. 1 has been used to monitor carbon dioxide in a small sample cell. Zirconium fluoride glass fibers were used to transmit the infrared radiation from the AOTF to the sample cell. The peak of the $CO_2$ absorption occurs at 4.25 microns. In this example, a small sized fiber (about 0.4 mm diameter) eight feet long was used. With this fiber, the signal level was about one hundred times weaker than without using fiber optic components. The use of the lock-in amplifier or precision demodulator combined with the AONF (acousto-optic notch filter) increased the signal to noise ratio and resulted in a sensitivity of better than plus or minus 1% change in the carbon dioxide gas in the sample cell. The signal from the lock-in amplifier was six millivolts, and the noise was 30 micro-volts. The noise a seen on an oscilloscope without the lock-in was approximately one millivolt.

Figure 3C:
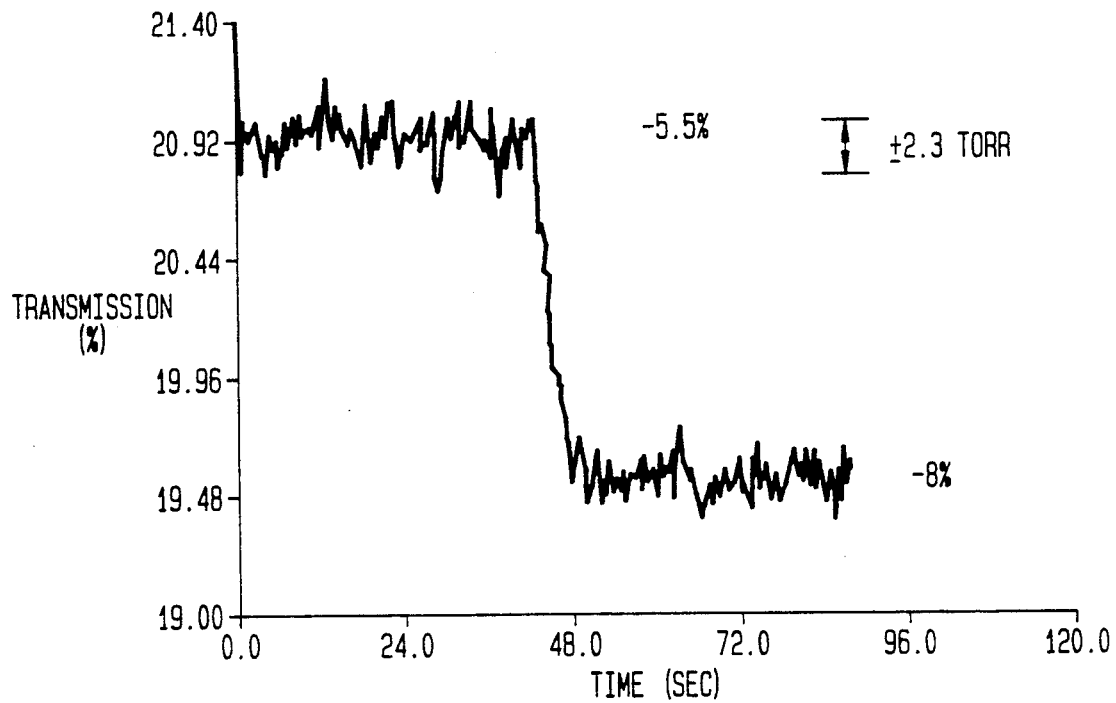
FIG. 3C shows a simulation of the apparatus in accordance with this invention wherein the lock-in amplifier is not used.
Figure 3D:
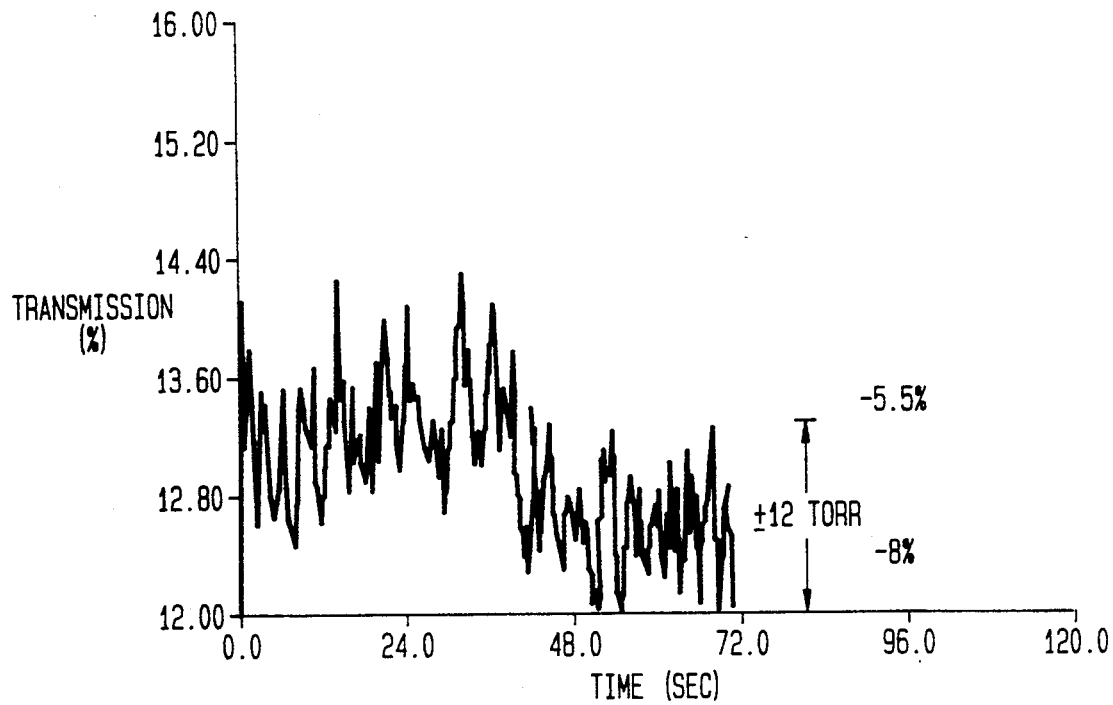
FIG. 3D shows the affect of decreasing average power from one watt to 0.2 watts by using the diffracted beam as shown in FIG. 3A.

FIG. 3A shows a step change in $CO_2$ from 5.5% to 8%. In this measurement, the upper diffracted beam was used (diffracted "e" beam, FIG. 2) and the noise was plus or minus 1.2 torr. FIG. 3B shows a step change from 8% to 5% using the middle un-diffracted beam (birefringent beam "b", FIG. 2). In this case, the noise was only plus or minus 0.6 torr. Therefore, the use of the AONF doubled the signal to noise in this measurement of carbon dioxide. For the measurements of FIG. 3A and FIG. 3B, the time constant was 100 msec., and the RF power was one watt. The effect of decreasing the average power to 0.2 watts can be seen in FIG. 3C (using the diffracted beam). The noise increased to plus or minus 2.3 torr. Thus, high average power (i.e. cw) gives better signal to noise than low average power.

FIG. 3C shows the effect of using a short time constant (1 msec.) with a lock-in amplifier technique. Because the noise level is normally considered as the RMS value, the output noise level corresponds to the square root of the time constant of the low pass filter of the lock-in amplifier. In this example, the noise increased to plus or minus 12 torr, or approximately ten times greater, because of the shorter time constant. Because this is a broadband response for both input signal and noise, it simulates the response of the pulsed RF power method without modulation and lock-in amplifier.

When the input signal was about more than 100 time bigger than the noise, this apparatus was used with a precision demodulator, and the signal to noise ratio of the output was as great as the lock-in amplifier had. The experiment was again repeated with a detector placed directly on the sample cell, where the signal was four times larger with a corresponding increase in a signal to noise ratio.

The measurements taken in Example 1 may be used for medical diagnostics, for example, where it is important to monitor the carbon dioxide concentration of exhaled air.

EXAMPLE 2

Figure 4:
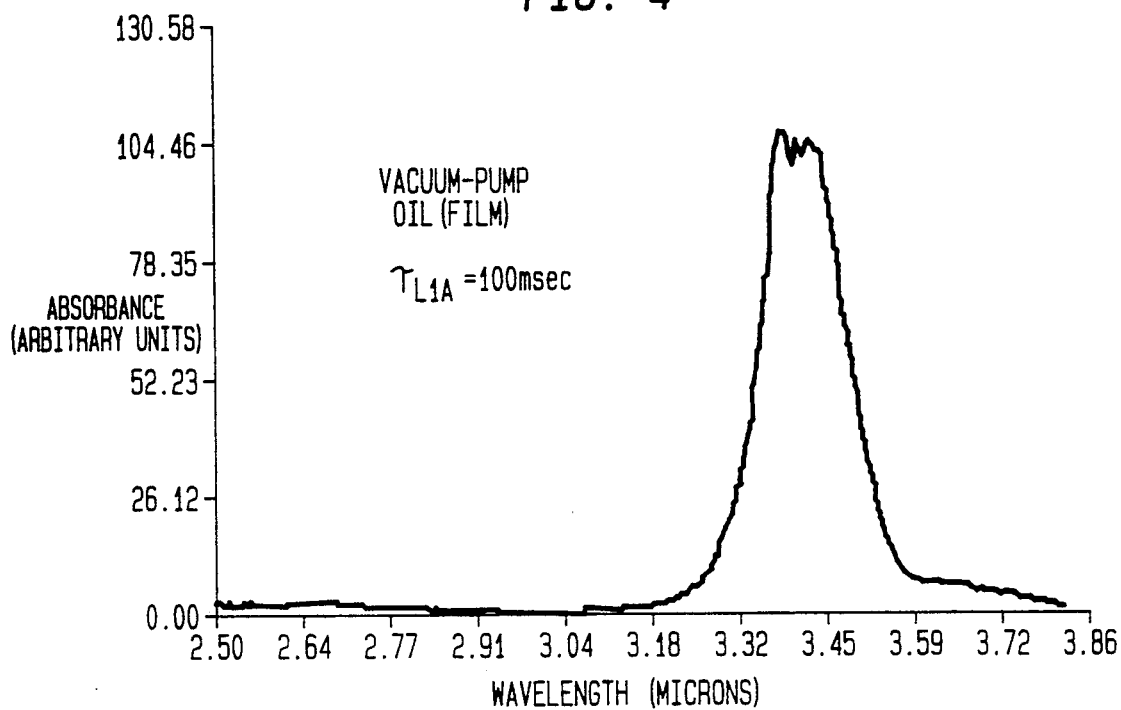
FIG. 4 shows the absorption band of an oil film as measured with this invention.

This system was used to detect a thin film of vacuum pump oil on a metal surface. The AOTF was scanned through the infrared region, and the light was transmitted through zirconium fluoride fibers to the sample. The resulting absorption band of the oil is shown in FIG. 4. In this example, the time constant on the lock-in amplifier was 100 msec., and the AOTF was used as a notch filter because the absorption band was relatively broad.

EXAMPLE 3

Figure 5:
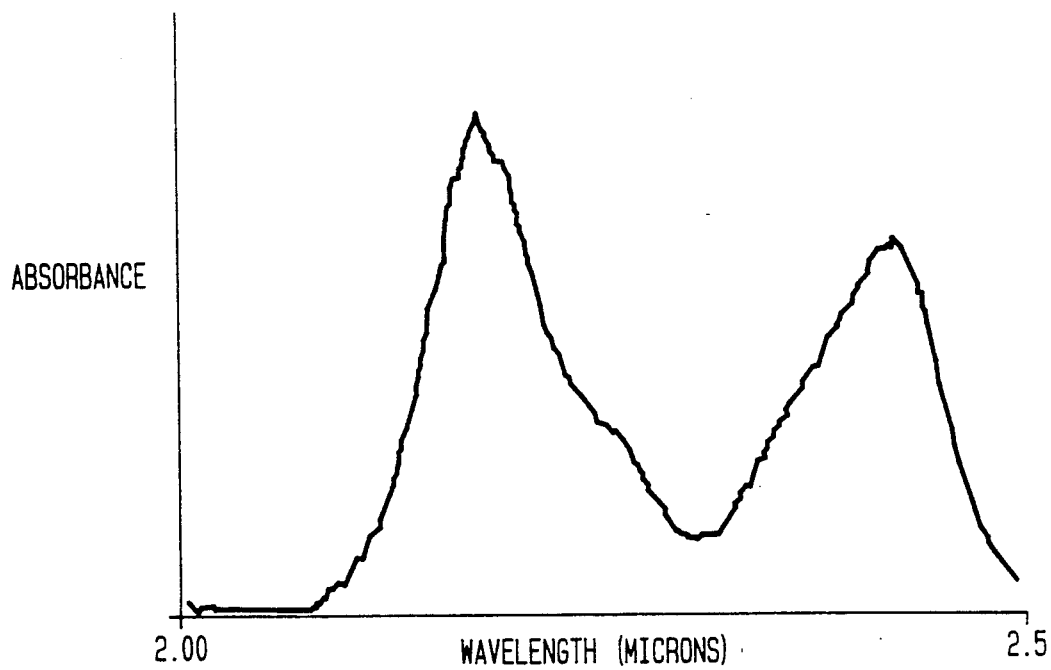
In FIG. 5 there is shown the absorption band obtained in detecting small amounts of methanol mixed in water.

This apparatus has also been used to perform a high speed scan of methanol to determine its absorption bands in the near infrared. The results of this test are shown in FIG. 5 where overtone absorption bands in the near infrared (1-3 micron) region.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A spectrometer comprising in combination:
   incoherent radiation source;
   an AOTF crystal for passing selective bands of light, having an RF input;
   a radio frequency source connected to said AOTF RF input, said source having an output which is continuous and which varies in frequency,
   and wherein said selected bands of light are the birefringent beam from said crystal.

2. The spectrometer of claim 1 wherein said AOTF crystal is tellurium dioxide ($TeO_2$).

3. The spectrometer of claim 1 wherein said RF source is modulated with a reference frequency to improve the signal to noise ratio.

4. The spectrometer of claim 3 wherein said reference frequency is at one Hz to five MHz.

5. The spectrometer of claim 4 wherein said reference frequency is sinusoidal.

6. The spectrometer of claim 4 wherein said reference frequency is 100 Hz to 100 KHz.

7. A spectrometer having an AOTF crystal having in combination:
   a radiation source;
   a AOTF crystal for passing selected bands of light, having a RF input;
   a source of radio frequency connected to said AOTF RF input, said source having an output which is continuous and which varies in frequency;
   means for passing light from said light source to said AOTF crystal;
   means for passing light from said AOTF crystal into a sample cell;
   means for detecting light from said sample cell;
   means for passing light from the sample cell to a detector means;
   and wherein said selected bands of lights are the birefringent beam from said crystal.

8. The spectrometer of claim 7 wherein said AOTF crystal is tellurium dioxide ($TeO_2$).

9. The spectrometer of claim 7 wherein said RF source is modulated with a reference frequency to improve the signal to noise ratio.

10. The spectrometer of claim 9 wherein said reference frequency is at one Hz to five MHz.

11. The spectrometer of claim 10 wherein said RF source is modulated at 100 Hz to 100 KHz.

12. The spectrometer of claim 9 wherein said reference frequency is sinusoidal.

13. The spectrometer in accordance with claim 7 further including means for changing said RF frequency.

14. The spectrometer of claim 13 further including a lock-in amplifier demodulator which rejects noise having frequencies other than at said reference frequency.

15. The spectrometer of claim 14 wherein said lock-in amplifier is selected from the group of an analog lock-in amplifier, a precision demodulator and a digital lock-in amplifier.

16. The spectrometer of claim 15 wherein said lock-in amplifier comprises a high speed analog to digital converter and a digital signal processor.

17. A spectrometer having an AOTF crystal comprising in combination:
   a light source;

means for passing light from said light source into a sample cell;

means for passing light from said sample cell to a detector;

said detector comprising:
(1) a AOTF crystal for receiving light from said means for passing light from said sample cell, said AOTF crystal having an RF input and passing selected bands of light;
(2) a radio frequency (RF) source connected to said AOTF input, said RF source having an output which is continuous;
(3) means for detecting the magnitude said selected bands of light from said AOTF crystal; and wherein said selected bands of light are the birefringent beam from said crystal.

18. The spectrometer of claim 17 wherein said AOTF crystal is tellurium dioxide ($TeO_2$).

19. The spectrometer of claim 17 wherein said means for passing light from said sample cell to a detector and said means for passing light into said sample cell is zirconium fluoride glass optical fibers.

20. The spectrometer of claim 17 wherein said RF source is modulated with a reference frequency to improve the signal to noise ratio.

21. The spectrometer of claim 20 wherein said reference frequency is at one Hz to 5 MHz.

22. The spectrometer of claim 21 wherein said reference frequency is 100 Hz to 100 KHz.

23. The spectrometer of claim 20 wherein said reference frequency is sinusoidal.

* * * * *